United States Patent [19]
Chikaki et al.

[11] Patent Number: 6,149,757
[45] Date of Patent: Nov. 21, 2000

[54] LAMINATING APPARATUS

[75] Inventors: Yoshiro Chikaki; Masafumi Ito; Tsugio Kirino, all of Tokyo, Japan

[73] Assignee: N.P.C. Inc., Tokyo, Japan

[21] Appl. No.: 09/006,074

[22] Filed: Jan. 12, 1998

Related U.S. Application Data

[63] Continuation of application No. 08/578,109, Dec. 26, 1995, abandoned.

[30] Foreign Application Priority Data

Dec. 27, 1994 [JP] Japan ...................................... 6-17044
Nov. 24, 1995 [JP] Japan ................................... 7-329791

[51] Int. Cl.$^7$ .................................................. B32B 31/00
[52] U.S. Cl. .......................................... 156/286; 156/382
[58] Field of Search ................................... 156/285, 286, 156/382

[56] References Cited

U.S. PATENT DOCUMENTS

| | | | |
|---|---|---|---|
| 4,104,101 | 8/1978 | Garabedian | 156/285 |
| 4,210,462 | 7/1980 | Tourneux | 156/286 X |
| 4,365,547 | 12/1982 | McClure, Jr. | 100/38 |
| 4,421,589 | 12/1983 | Armini et al. | 156/382 |
| 4,689,105 | 8/1987 | Fazlin et al. | 156/382 |
| 5,078,820 | 1/1992 | Hamamura et al. | 156/267 |
| 5,182,121 | 1/1993 | Miyashita | 156/382 X |
| 5,324,382 | 6/1994 | Whiteside | 156/359 |
| 5,399,223 | 3/1995 | Vogt | 156/285 |
| 5,403,421 | 4/1995 | Hinterseer | 156/196 |
| 5,580,415 | 12/1996 | Diekwisch | 156/382 |

OTHER PUBLICATIONS

Letter dated Dec. 12, 1996 from Michael W. O'Dougherty to Hisashi Sato.
Letter date Jan. 23, 1997 from John M. DiMatteo to Michael W. O'Dougherty.

*Primary Examiner*—Francis J. Lorin
*Attorney, Agent, or Firm*—Patterson, Belknap, Webb & Tyler LLP

[57] ABSTRACT

According to the present invention, there is proposed a laminating apparatus for laminating materials to be laminated. The apparatus includes at least one laminating section (9). Each laminating section (9) comprises an upper chamber (5) and an under chamber (6) wherein both chambers are divided with a diaphragm means (4). The apparatus further includes a heating stage (10) for heating the materials put on the stage in the under chamber (6). The stage (10) is movable between an upward position and a downward position. Further the apparatus includes a supporting means (13) which can support the materials in a position above and apart form the upper surface of the stage (10) when the stage locates in its downward position.

12 Claims, 13 Drawing Sheets

LAMINATING APPARATUS

This application is a continuation of application Ser. No. 08/578,109 filed Dec. 26, 1995, now abandoned.

BACKGROUND OF THE INVENTION

The present invention relates to a laminating apparatus for laminating materials to be laminated such as solar cell panels or laminated glasses.

In recent years, various technologies as to a solar cell have been developed in order to utilize a solar energy. For example, many kinds of solar cells such as a crystal type solar cell using monocrystal silicon or polycrystal silicon and an amolphous type solar cell using amolphous silicon (noncrystal) are proposed. In any case, crystal type or amolphous type, however, silicon in itself is easily affected by chemical change and physical shock. Therefore, the solar cell panels are usually manufactured by laminating the silicon with the vinyl films or the heat resistance glasses. Further, recently, integrated modules, which integrate the solar panels and the building materials such as the external wall materials or the roof materials, is also manufactured. In case laminating such integrated modules, proper reinforced materials such as the vinyl films or the heat resistance glasses are used.

Traditionally, there are disclosed some laminating apparatuses for manufacturing solar cell panels, so called 'double vacuum type laminating apparatus' which include an upper chamber and an under chamber divided with a diaphragm means. JPB 4-6556 entitled 'laminating apparatus for solar cell module' the above mentioned double vacuum type laminating apparatuses. The laminating apparatuses disclosed in the above publications include the upper chamber provided with a heating stage. In the operation, putting the materials to be laminated on the heating stage, evacuating both of the upper chamber and the under chamber, adding heat to the materials to be laminated, and introducing the atmosphere into the upper chamber, then the materials to be laminated are compressed and laminated between the upper surface of the heating stage and the diaphragm.

Since, in the traditional laminating apparatuses, the solar cell panel is directly put on the heating stage, the solar cell panel is undesirably heated under the atmosphere before evacuating the chamber. Once the solar cell panel is heated before evacuating, the resin as a filler begin to melt before fully removing the air inside the solar cell panel and it is possible that the air bubbles remain inside the panel. In use of the solar cell panel, the air bubbles remaining inside the solar cell panel are expanded by the increase of temperature caused by the electro motive force or the open air, resulting in the degradation of the solar cell panels and the shorten product life thereof. Recently, a materials such as EVA (ethylenevinylacetate) having a short bridge formation time is developed, however, in case manufacturing the solar cell panels using EVA resin having such a short bridge formation time, it is probable that more air bubbles remain in the resultant panel.

Especially, in case that large solar cell panels using reinforcing materials such as the heat resistance glasses are directly put on the heating stage of high temperature, the entire body of the solar cell panels is apt to be bent by the rapid increase of temperature. Since the entire surface of the bent panels cannot fully contact the upper surface of the heating stage, it fails to heat equally the entire body of the solar cell panels and it results in the defective laminated products.

Further, according to almost all traditional laminating apparatuses, it can be manufactured only a stereotype solar cell panel having the thickness of about 6 to 7 mm. Especially, recently it is required to provide the integrated modules, which integrate the solar panel and the building materials such as the external wall materials or the roof materials, however, according to the traditional laminating apparatuses, it is impossible to laminate materials having different thickness, a bent materials such as the integrated modules or so with the same apparatus. Accordingly the traditional apparatus have only a narrow general applicability. Furthermore, according to the traditional laminating apparatuses, since the solar cell panel always contact the surface of the heating stage during the laminating process, it is hard to carry out the product from the apparatus after finishing the process.

SUMMARY OF THE INVENTION

Accordingly, an object of the present invention is to provide a novel and improved laminating apparatus which can laminate materials to be laminated such as solar cell panels without remaining air bubbles inside it, which can laminate various materials having different thickness with the same apparatus, which can laminate the bent materials such as the integrated modules and from which the products are easily carried out after finishing the process.

According to the first aspect of the present invention, there is provided a laminating apparatus for laminating materials to be laminated which comprising:

(a) at least one laminating section, each laminating section comprising an upper chamber and an under chamber wherein both chambers are divided with a diaphragm means;

(b) a heating stage for heating the materials put on the stage in the under chamber, which stage is movable between an upward position and a downward position;

(c) a supporting means which can support the materials in a position above and apart from the upper surface of the stage when the stage locates in the downward position.

In the operation, at the first step, the heating stage is positioned in its downward position and the materials to be laminated are carried into the under chamber and they are put on the supporting means in the position apart from the heating stage. Then the whole laminating apparatus is airtightly closed and the both chambers are evacuated at the same time. Thereafter, lifting the heating stage, the materials directly contact the upper surface of the heating stage and the materials can be heated. Further, introducing the atmosphere into the upper chamber, the materials are compressed between the diaphragm means and the upper surface of the heating stage and the materials are laminated to each other. After finishing the laminating process, the atmosphere is introduce in the under chamber, the stage is moved downward and the materials are supported by the supporting means again. Then the laminating apparatus is opened to the atmosphere and the laminated product is carried out from the apparatus.

According to the second aspect of the present invention, there is provided a laminating apparatus for laminating materials to be laminated which comprising:

(a) at least one laminating section, each laminating section comprising an upper chamber and an under chamber wherein both chambers are divided with a diaphragm means;

(b) a heating stage for heating the materials put on the stage in the under chamber;

(c) a moving means for moving the materials between an upward position where the materials are supported above and apart from the upper surface and a process position where the materials are put on the upper surface of the stage.

In the operation, at the first step, the materials are moved to the upward position apart from the upper surface of the heating stage by the moving means. There the materials do not contact directly the upper surface of the heating stage. Then the whole laminating apparatus is airtightly closed and the both chambers are evacuated at the same time. After that the materials is put on the upper surface of the heating stage by the moving means and the material is heated. Further, introducing the atmosphere into the upper chamber, the materials are compressed between the diaphragm means and the upper surface of the stage and the materials are laminated in each other. After finishing the laminate process, the atmosphere is introduce in the under chamber. And, the laminated materials are moved to the upward position apart from the surface of the heating stage by the moving means. The laminating apparatus is opened to atmosphere and the products are carried out from the laminating section.

DETAILED DESCRIPTION OF THE PREFERRED EMBODIMENT

In reference with the accompanying drawings, the invention will now be described in detail in the following, in connection with several exemplary embodiments of the laminating apparatus, which are constituted according to the present invention.

Figure 1:
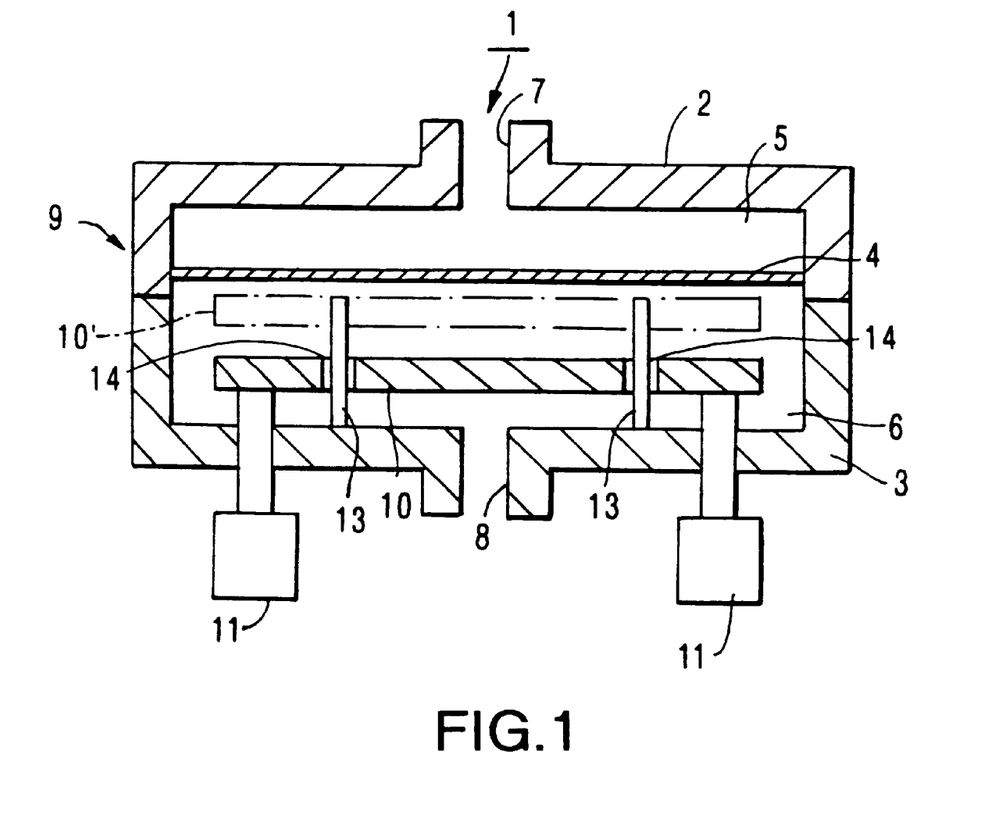
FIG. 1 is a sectional view, cut in vertical direction, of the laminating apparatus according to the first preferred embodiment of the present invention which includes the heating stage which is movable between the upward position and the downward position.

Firstly a constitution of a laminating apparatus 1 according to the first embodiment of the present invention, which includes a heating state 10 movable between an upward position and an downward position wherein materials to be laminated are supported in a position above and apart from the heating stage 10, is described in reference with FIG. 1.

The laminating apparatus 1 has a laminating section 9 which comprises an upper case 2 and an under case 3 wherein the both cases can be opened according to the necessity. The laminating apparatus 1 can provide with a mechanism such as air cylinder (not shown) in order to lift the upper cases 2 to easily open the laminating section 9. A diaphragm 4 is provided in the upper case 2. The diaphragm 4 can be made of a heat resistance rubber such as fluorine contained rubber. As shown in the drawing, in a closed state of the laminating section 9, i.e. the upper case 2 and the under case 3 are closed in each other, an upper chamber 5 and an under chamber 6, which is vertically divided by the diaphragm 4, are formed inside the laminating section 9. Suction and exhaust ports 7, 8 are provide in the upper surface of the upper case 2 and in the under surface of the under case 3, respectively. As shown in the drawing, in the closed state of the laminating section 9, the upper chamber 5 and the under chamber 6 can be evacuated through the suction and exhaust ports 7, 8, respectively and to the contrary the atmosphere can be introduced into the upper chamber 5 and the under chamber 6 through the suction and exhaust ports 7, 8, respectively.

The heating stage 10 is provided in the under case 3. The heating stage 10 includes, for example, a sheath type heater made of aluminum. The heating state 10 can include a water cooled pipe in order to accurately control the heating temperature. A lifting mechanism 11 is provided under the under case 3 in order to move the heating stage 10 upward and downward according to the necessity. The lifting mechanism 11 is constituted by appropriately selecting the well known components, for example an air cylinder, an ball screw, an rack and pinion and so on. In FIG. 1, a position of the heating stage 10, in which the heating state 10 is moved downward by the lifting mechanism 11 and it locates in the downward position, is shown by a solid line 10. Another position of the heating stage 10, in which the heating stage 10 is moved upward by the lifting mechanism 11 and it locates in the upward position, is shown by a alternate long and short dash line 10'.

Supporting rods 13 are provided in the bottom of the under case 3 and extrude from the bottom. There are provided corresponding through holes 14 in the heating stage 10. When the heating stage 10 is moved downward by the lifting mechanism 11 (whose position is shown by the solid line 10 in FIG. 1), the upper ends of the supporting rods 13 extrude above through the through holes 14 from the upper surface of the heating stage 10. On the other hand, when the heating stage 10 is moved upward by the lifting mechanism 11 (whose position is shown by the alternate long and short dash line 10' in FIG. 1), the upper ends of the supporting rods 13 forms same surface as the upper surface of the heating stage 10.

Figure 2:
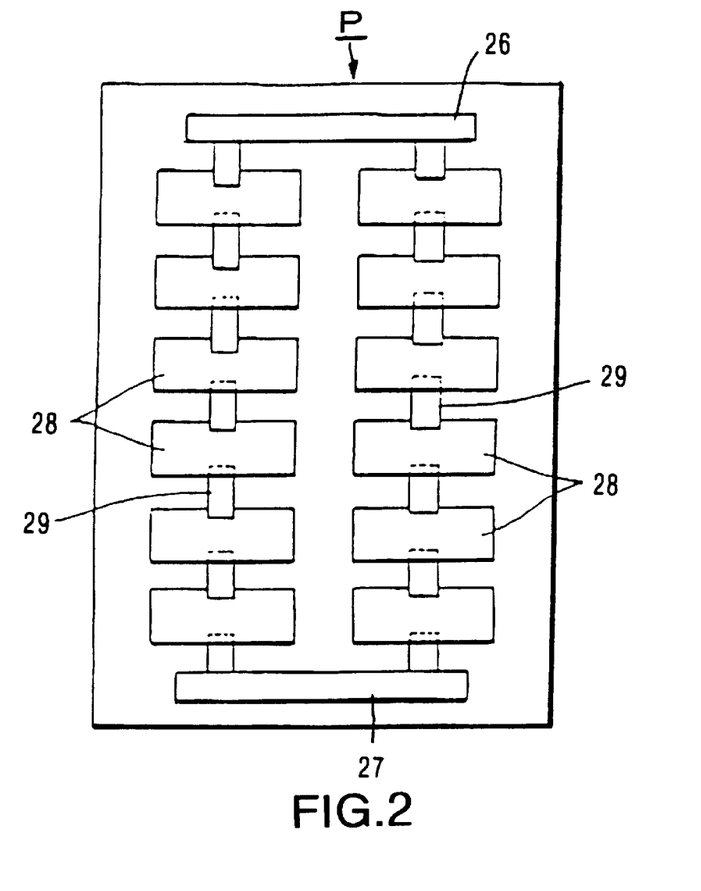
FIG. 2 is a plane view of the solar cell panel to be laminated.
Figure 3:
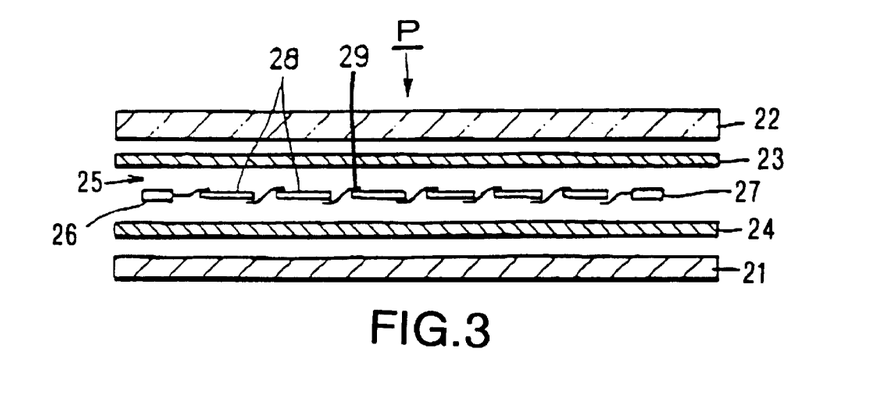
FIG. 3 is an side view of the solar cell panel to be laminated.

FIG. 2 and FIG. 3 are plane view and side view, respectively, which show a solar cell panel P as an exemplary embodiment of the materials to be laminated, preferably produced by the laminating apparatus 1 of FIG. 1. The solar cell panel P has a sandwich construction such that strings 25 are sandwiched between a reinforcement material 21 and a cover glass 22 through fillers 23, 24. For example, PE (Polyethylene) resin can be used as the reinforcement material, EVA (ethylenevinylacetate) resin can be used as the fillers 23, 24. EVA resin having short bridge time which is recently developed, can be also used as the fillers 23, 24. The strings 25 are constituted by connecting solar cell 28 arranged between an electrode 26 and an electrode 27 through leads 29.

Figure 4:
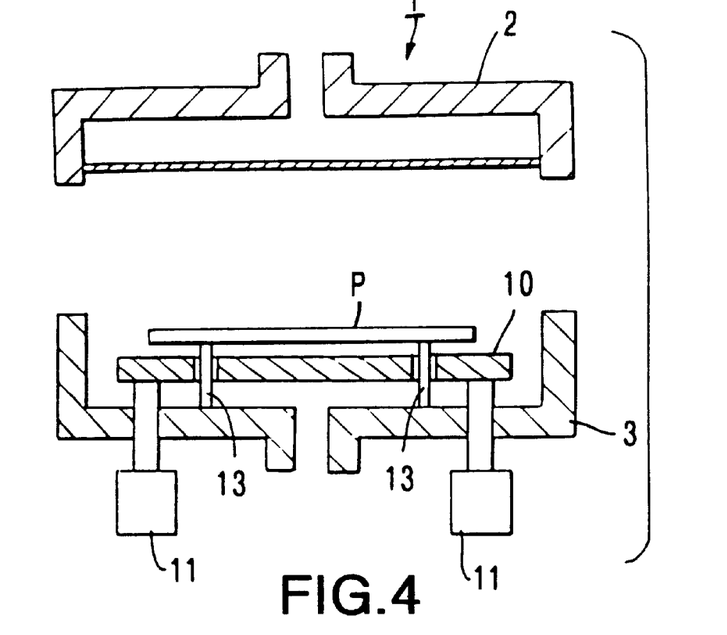
FIG. 4 is an explanation view which shows a state in which materials to be laminated is carried in the laminating apparatus of in FIG. 1.

In the next, the operation of the laminating apparatus 1 will be described, in reference with a case which produces the above mentioned solar cell panel P. In order to carry the solar cell panel P into the laminating apparatus 1, as shown in FIG. 4, the upper case 2 is moved upward to open the laminating section 9. The upper case 2 can be moved upward for example by an air cylinder (not shown). The heating stage 10 of the under case 3 is moved downward to the downward position by the lifting mechanism 11. In this state, the solar cell panel P, as the materials to be laminated, is put on the upper ends of the supporting rods 13 extruding above from the upper surface of the heating stage 10. As described above in reference with FIG. 3, the solar cell panel P has the sandwich construction wherein the strings 25 are sandwiched between the reinforcement material 21 and the cover glass 22 through fillers 23, 24. As shown in the drawing, at this state, the solar cell panel P does not contact the upper surface of the heating panel 10.

Figure 5:
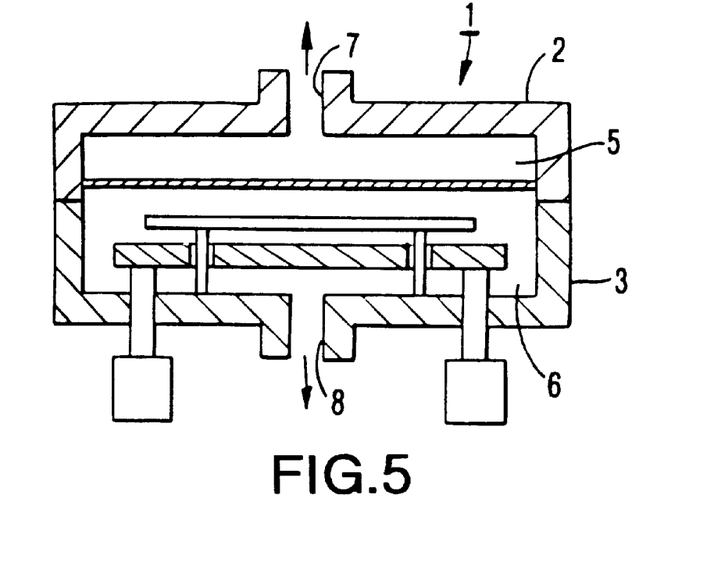
FIG. 5 is an explanation view which shows a state in which the upper chamber and the under chamber of the laminating apparatus of FIG. 1 are evacuated.

After carrying the materials into the laminating section 9, as shown in FIG. 5, the laminating section 9 is airtightly closed by moving the upper case 2 downward. Thereafter, the upper chamber 5 and the under chamber 6 are evacuated at the same time through the suction and exhaust ports 7, 8, respectively.

Figure 6:
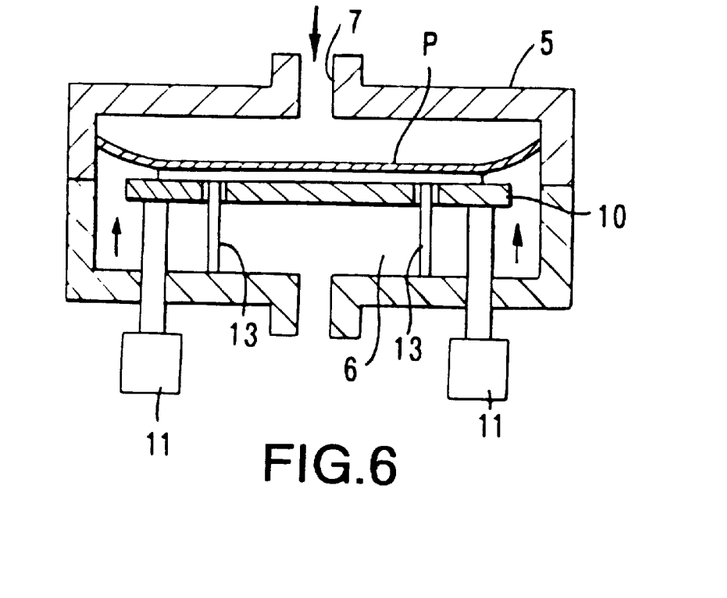
FIG. 6 is an explanation view which shows a state in which the materials to be laminated are heated and compressed in the laminating apparatus of FIG. 1.

After evacuating the upper chamber 5 and the under chamber 6 to a predetermined degree of vacuum, for example, 0.7 to 1.0 Torr, as shown in FIG. 6, the heating stage 10 is moved upward by the lifting mechanism 11. In this state, the solar cell panel P which was supported on the upper ends of the supporting rods 13, now directly contact the upper surface of the heating stage 10, and the solar cell panel P is heated on the heating stage 10. Then, chemical reaction of EVA resin, fillers 23, 24 in the solar cell panel P, is stepped up to form bridge construction smoothly. In keeping the state, the atmosphere is introduced into the upper chamber 5 through the suction and exhaust port 7, then the diaphragm 4 expands downward to compress the solar cell panel P between the upper surface of the heating stage 10 and the diaphragm 4.

Figure 7:
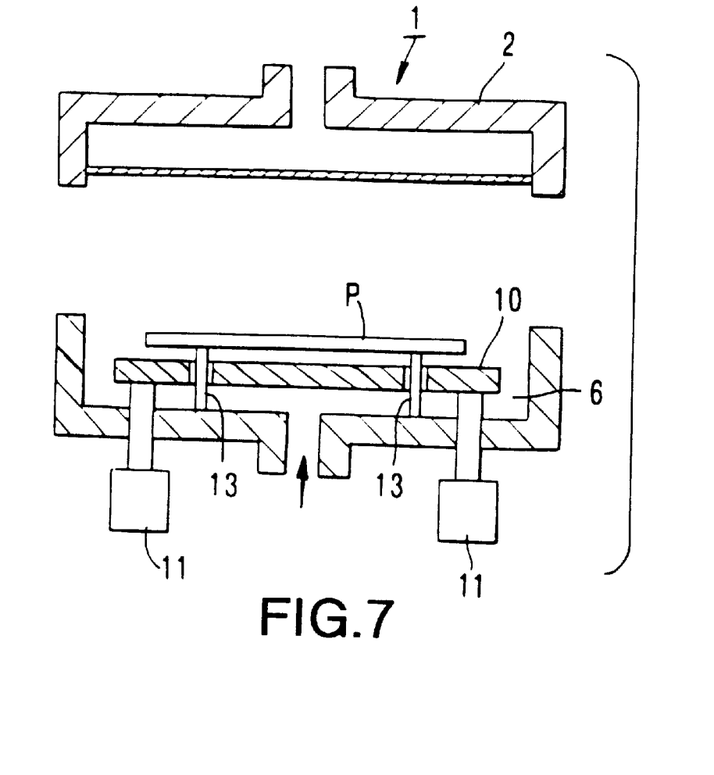
FIG. 7 is an explanation view which shows a state in which after finishing the process, the laminated products are carried out from the laminating apparatus of FIG. 1.

The laminating process finished by heating and compressing the solar cell panel P. After finishing the process, the atmosphere is introduced into the under chamber 6 and the heating stage 10 is moved downward by the lifting mechanism 11. In the result, the upper ends of the supporting rods 13 extend above from the upper surface of the heating stage 10 and the laminated solar cell panel P is supported by the supporting rods 13. Then, as shown in FIG. 7, the upper case 2 is moved upward to open the laminating section 9 and the solar cell panel P is carried out from the laminating section 9.

As a result, according to the present invention, the solar cell panel P having high performance without remaining air bubbles inside the produced panel can be obtained.

In the next, exemplary embodiment according to the present invention will be described in reference with a laminating apparatus 50 which includes a moving means for moving the materials to be laminated such as the solar cell panel P from the upper surface of the heating stage.

Figure 8:
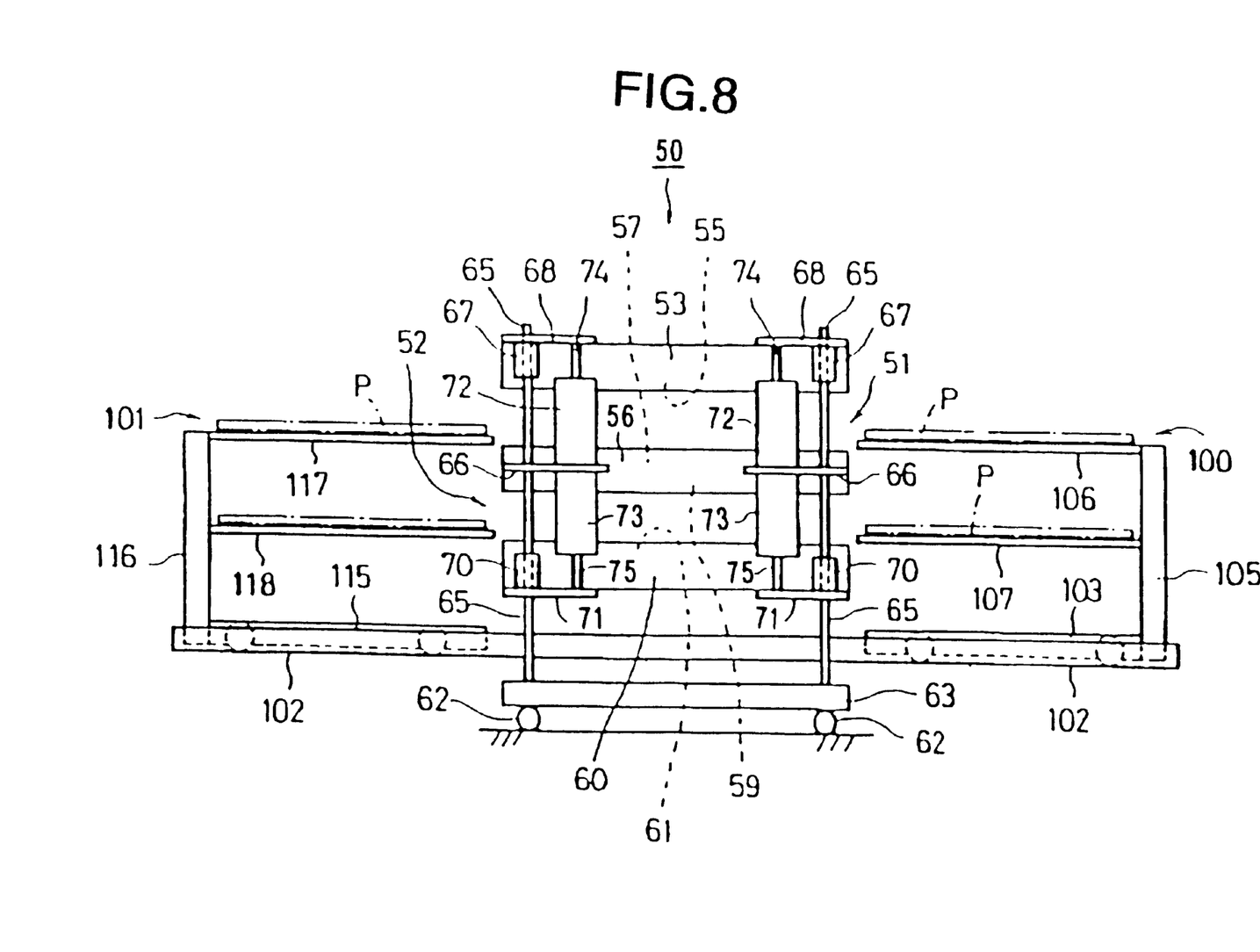
FIG. 8 is a front view of the laminating apparatus according to another preferred embodiment of the present invention which includes two laminating sections stacked in each other in vertical direction wherein each laminating sections has the moving means for moving the materials to be laminated to the upward position above the heating stage.

The laminating apparatus 50 provides with an upper laminating section 51 and an under laminating section 52 which are stacked up and down. The upper laminating section 51 comprises a first upper chamber 55 provided in an upper case 53 and a first under chamber 57 provided in an upper portion of a center case 52. The under laminating section 52 comprises a second upper chamber 59 provided in the under portion of the center case 56 and a second under chamber 61 provided in an under case 60.

The center case 56 is attached to columns 65 provided on the four corners of a base 63 by means of brackets 66. The base 63 has casters for freely moving on the floor. Thus, the supporting height of the center case 56 can be kept in a constant level. On the other hand, the upper case 53 is attached to guides 67 through brackets 68 which support the guides 67. The guides 67 can freely move along the columns 65. Thus, the upper case 53 can move upward and downward in the upper space of the center case 56 in keeping the position parallel to the center case 56. Further the under case 60 is attached to guides 70 through brackets 71 which support the guides 70. The guides 70 can also freely move along the columns 65. Thus, the under case 60 can move upward and downward in the lower space of the center case 56 in keeping the position parallel to the center case 56.

Further, cylinders 72, 73 are provided above and under the brackets 66 which are fixed to the center case 56, respectively. The ends of piston rods 74 of the cylinders 72 are connected to the brackets 68 which are fixed to the upper case 53 and the ends of piston rods 75 of the cylinders 73 are connected to the brackets 71 which are fixed to the under case 60. Accordingly, in case that the piston rods 74 expand in response to the operation of the cylinder 72, the upper case 53 moves upward to the upward position apart from the upper surface of the center case 56 and therefore the upper laminating 51, which comprises the first upper chamber 55 provided in the upper case 53 and the first under chamber 57 provided in the upper space of the center case 56, can be opened. On the other hand, in case that the piston rods 74 retract in response to the operation of the cylinder 72, the upper case 53 moves downward to contact the upper surface of the center case 56 and therefore the upper laminating section 51, which comprises the first upper chamber 55 provided in the upper case 53 and the first under chamber 57 provided in the upper space of the center case 56, can be airtightly closed.

Furthermore, in case that the piston rods 75 expand in response to the operation of the cylinder 73, the under case 60 moves downward to the downward position apart from the under surface of the center case 56 and therefore the under laminating section 52, which comprises the second upper chamber 59 provided in the lower space of the center case 56 and the second under chamber 61 provided in the under case 60, can be opened. On the other hand, in case that the piston rods 75 retract in response to the operation of the cylinder 73, the under case 60 moves downward to the downward position apart from the under surface of the center case 56 and therefore the under laminating section 52, which comprises the second upper chamber 59 provided in the lower space of the center case 56 and the second under chamber 61 provided in the under case 60, can be airtightly opened.

Figure 10:
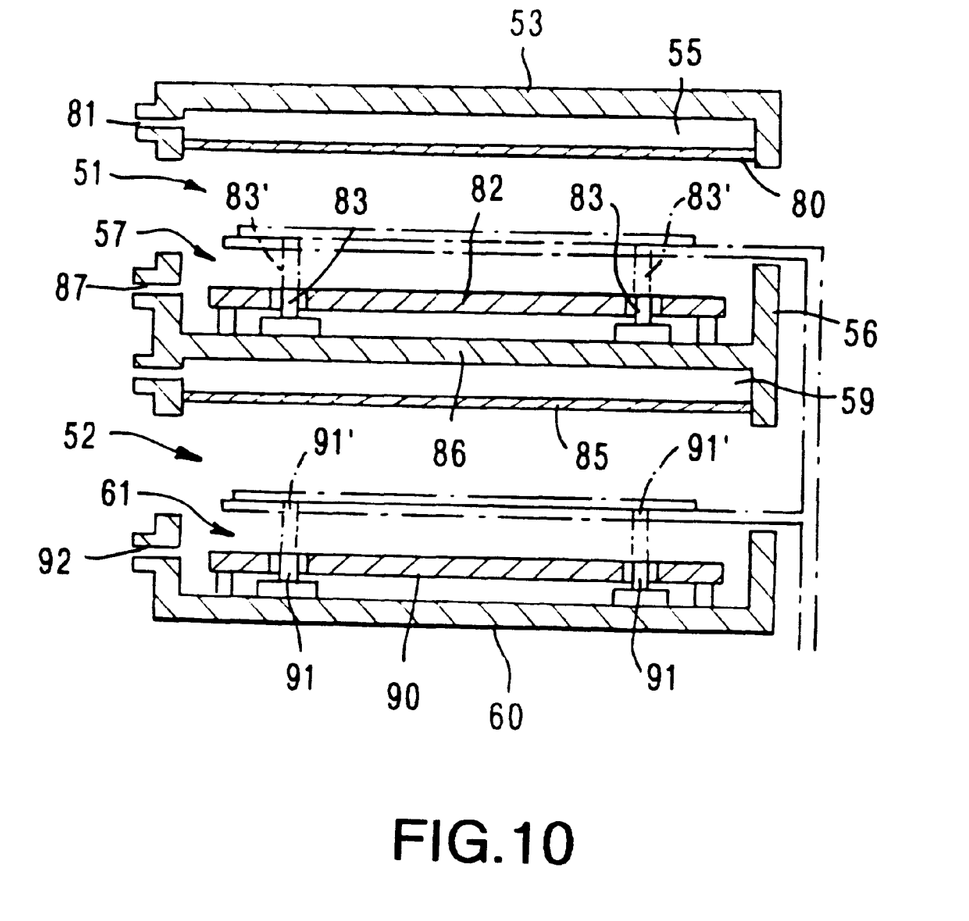
FIG. 10 is a sectional view, cut in vertical direction, of the laminating section of the laminating apparatus of FIG. 8.

As shown in FIG. 10, a diaphragm 80 is provided in the upper case 53 to divide the inside thereof in horizontal direction to form the first upper chamber 55 surrounded with the diaphragm 80 and the inner wall of the upper case 53. The diaphragm 80 can be made from a heat resistance rubber such as fluorine contained rubber. A suction and exhaust port 81 in connection with the first upper chamber 55 is provided in the side wall of the upper case 53. The first upper chamber 55 can be evacuated through the suction and exhaust port 81 and to the contrary the atmosphere can be introduced into the first upper chamber 55 through the suction and exhaust port 81.

The heating stage 82 is provided in the first under chamber 56 which is provided in the upper space of the center case 56. The heating stage 82 includes, for example, a sheath type heater made of aluminum. The heating stage 82 can include a water cooled pipe in order to accurately control the heating temperature. There are provided a plurality of pins 83 for moving the solar cell panel P as a material to be laminated from the upper surface of the heating stage 82 to the upward position. These pins can move in response to the operation of a lifting mechanism (not shown) between an downward position in which, as shown in the drawing with a solid line 83, the level of the upper ends of the pins 83 becomes same level as of the upper surface of the heating stage 82, and an upward position in which, as shown in the drawing with an alternate long and short dash line 83', the upper ends of the pins 83 extrude above from the upper surface of the heating stage 82. The lifting mechanism (not shown) is constituted by appropriately selecting the well known components, for example an air cylinder, an ball screw, an rack and pinion and so on.

Further, a diaphragm 85 is provided in the second upper chamber 59, which locates in the lower space of the center case 56, to divide the inside thereof in horizontal direction to form the second upper chamber 59. The second upper chamber 59 is surrounded with the diaphragm 85 and the inner wall of the lower space of the center case 56. The diaphragm 85 can be made of a heat resistance rubber such as fluorine contained rubber.

The first under chamber 57 and the second upper chamber 59, which are provided in the upper and lower spaces of the center case 56, respectively, are airtightly divided with board 86. Suction and exhaust ports 87, 88 in connection with the first under chamber 57 and the second upper chamber 59 are provided in the side wall of the center case 56, respectively. The first under chamber 57 and the second upper chamber 59 can be evacuated through the suction and exhaust ports 87, 88, respectively and to the contrary the atmosphere can be introduced into the first under chamber 57 and the second upper chamber 59 through the suction and exhaust ports 87, 88, respectively.

A heating stage 90 is provided in the second under chamber 61 which is provided in the under case 60. The heating stage 90, as same as the former construction, includes, for example, a sheath type heater made of aluminum and also a water cooled pipe in order to accurately control the heating temperature. Further there are provided a plurality of pins 91 for moving the solar cell panel P as a material to be laminated from the upper surface of the heating stage 90 to the upward position. These pins 91 can move in response to the operation of a lifting mechanism (not shown) between an downward position in which, as shown in the drawing with a solid line 91, the level of the upper ends of the pins 91 becomes same level as of the upper surface of the heating stage 90, and an upward position in which, as shown in the drawing with an alternate long and short dash line 91', the upper ends of the pins 91 extrude above from the upper surface of the heating stage 90. The lifting mechanism (not shown) is constituted by appropriately selecting the well known components, for example an air cylinder, and ball screw, an rack and pinion and so on. Further there is provided a suction and exhaust ports 92 in connection with the second under chamber 61. The second under chamber 61 can be evacuated through the suction and exhaust port 92 and to the contrary the atmosphere can be introduced into the second under chamber 61 through the suction and exhaust ports 92.

There is provided in the side of the laminating sections 51, 52, a carrying-in means 100 for carrying-in the solar cell panel P as materials to be laminated into the laminating sections 51, 52 and carrying-out means 101 for carrying-out the solar cell panel P from the laminating sections 51, 52.

The carrying-in means 100 includes a traveling part 103 which can travel along a guide rail 102 horizontally extending through the base 63 or the columns 65 in a lower position of the laminating apparatus 50 and an upper table 106 and an under table 107 which are supported by columns 105 provided on the traveling part 103. The solar cell panels P as materials to be laminated can be positioned in the predetermined positions on the upper table 106 and on the under table 107 by a transferring mechanism such as robot (not shown). And the solar cell panels P are carrying-in into the laminating sections 51, 52 from the upper table 106 and the under table 107 by traveling motion of the traveling part 103.

Figure 9:
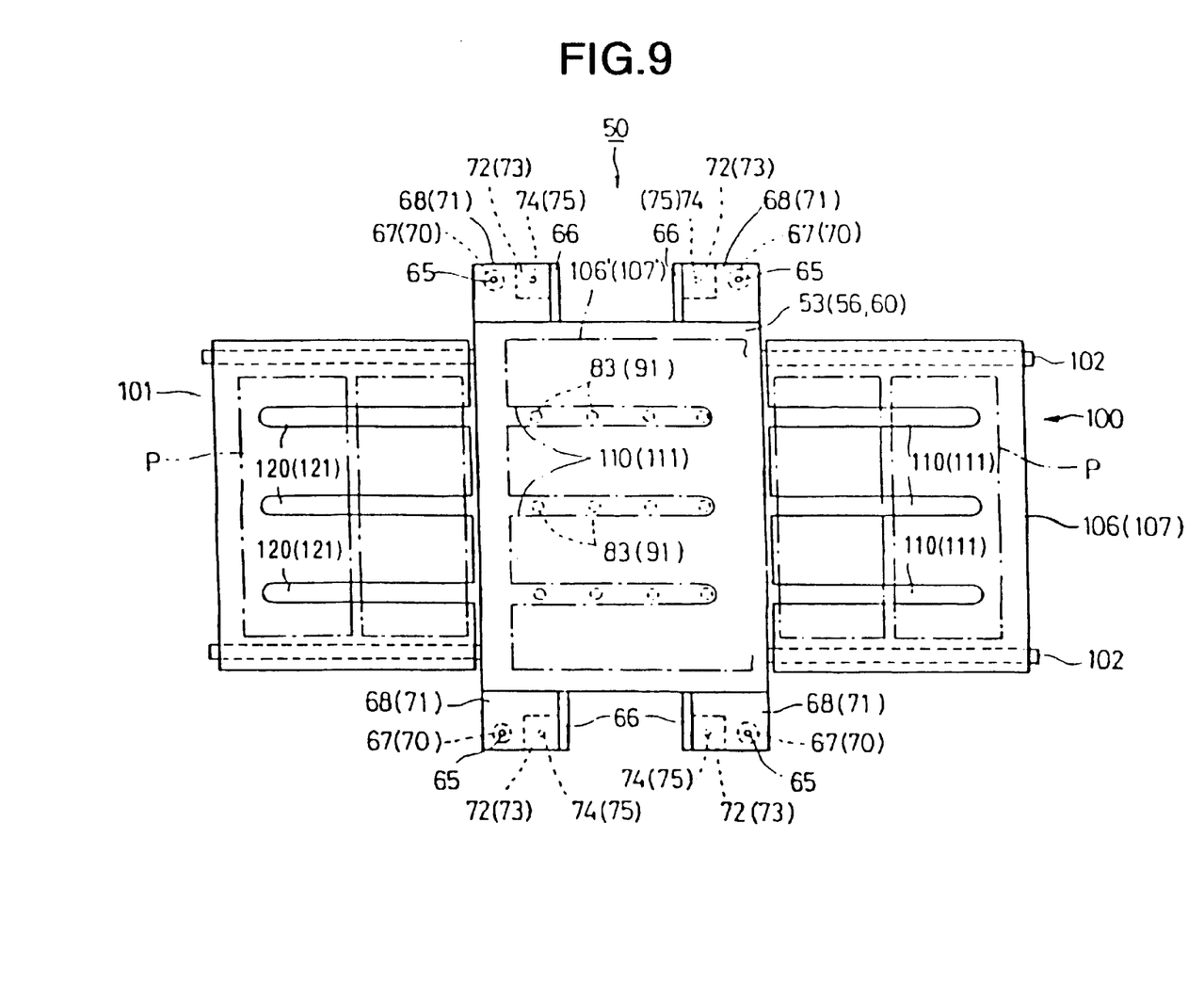
FIG. 9 is a plane view of the laminating apparatus of FIG. 8.

Further, as shown in FIG. 9, there is provided a plurality of cutouts or slots 110, 111 on the upper table 106 and the under table 108, respectively. In the FIG. 9, alternative long and short dash line 106', 107' show a position of the upper table 106 and the under table 107 wherein the solar cell panels P are carried-in into the laminating sections 51, 52 by the traveling operation of the traveling part 103. Therefore, when the solar cell panels P are carried-in into the laminating sections 51, 52 by the carrying-in means 100, since the cutouts 110, 111 locate just above the pins 83 of the first under chamber 57 and the pins 91 of the second under chamber 61, the upper table 106 and the under table 108 are not obstacles for the upward and downward moving action of the pins 83 of the first under chamber 57 and the pins 91 of the second under chamber 61.

As same as the above, the carrying-out means 101 includes a traveling part 115 which can travel along a guide rail 102 and an upper table 117 and an under table 118 which are supported by columns 116 provided on the traveling part 103. When upper table 117 and the under table 118 move into the laminating sections 51, 52, the solar cell panels P laminated in the laminating sections 51, 52 are received by the tables 117, 118 and the received solar cell panels P are carried-out from the laminating sections 51, 52. Further, the solar cell panels P are transferred from the upper table 117 and the under table 118 by the transferring mechanism such as robot (not shown).

Further, as same as the construction of the carrying-in means 100, there is provided a plurality of cutouts or slots 120, 121 on the upper table 117 and the under table 118 of the carrying-out means 101. Therefore, in case that the upper table 117 and the under table 118 move into the laminating sections 51, 52 by the traveling operation of the traveling part 115, since the cutouts 120, 121 locate just above the pins 83 of the first under chamber 57 and the pins 91 of the second under chamber 61, the upper table 110 and the under table 111 are not obstacles for the upward and downward moving action of the pins 83 of the first under chamber 57 and the pins 91 of the second under chamber 61.

In the next, a process for manufacturing the solar cell panels P as materials to be laminated which was described in FIG. 2 and FIG. 3 according to the exemplary laminating apparatus 50, will be described below.

Figure 11:
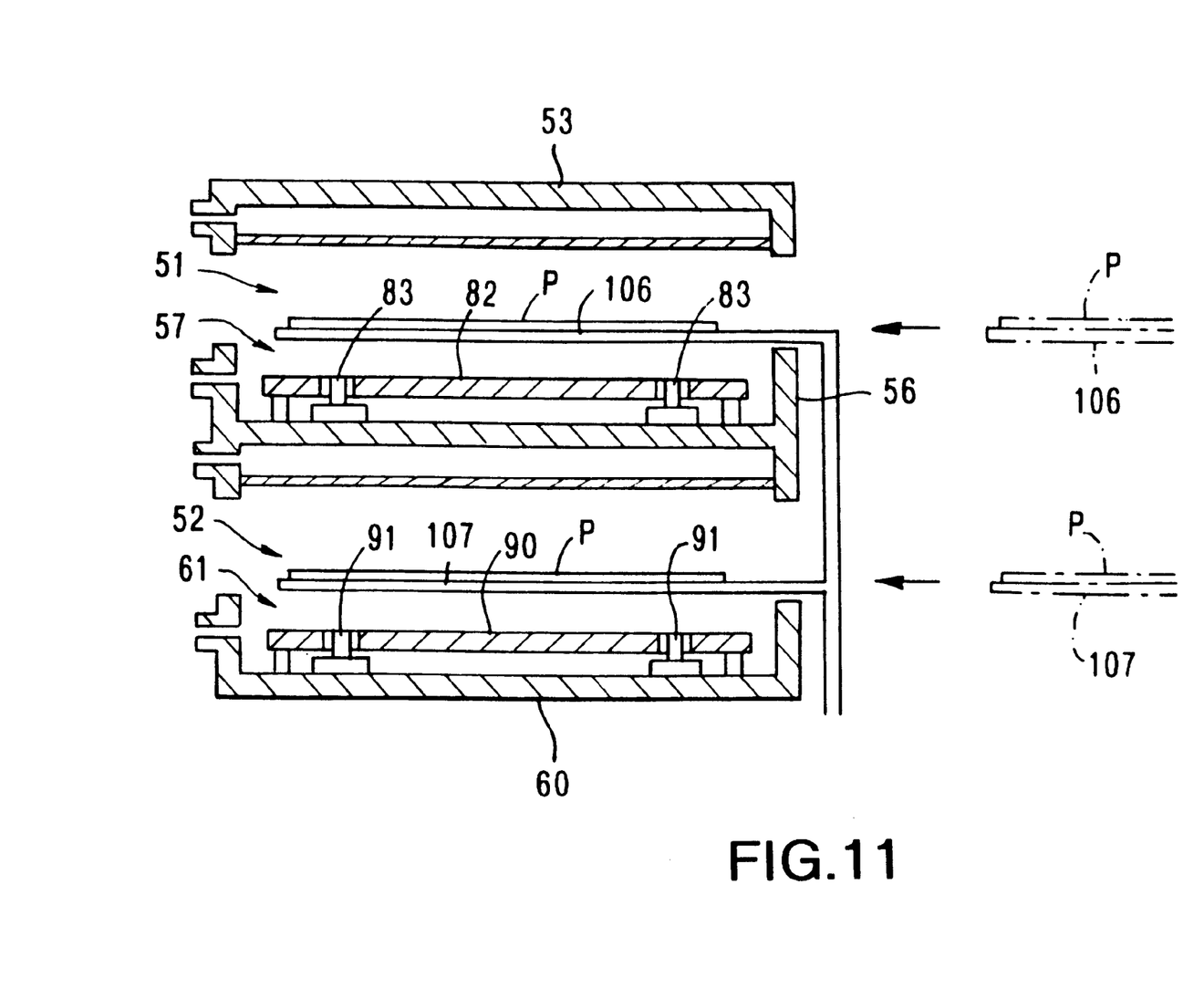
FIG. 11 is an explanation view which shows a state in which materials to be laminated is carried in the laminating apparatus of in FIG. 8.

Firstly, in case carrying-in the solar cell panels P into the upper laminating section 51 and the under laminating section 52 of the laminating apparatus 50, as shown in FIG. 11, the upper case 53 is moved upward and the under case 60 is moved downward and the upper laminating section 51 and the under laminating section 52 are opened, respectively. The upward moving action of the upper case 53 and the downward moving action of the under case 60 are performed by the expanding movement of the cylinder 72 and the cylinder 73 as already described in FIG. 8 and FIG. 9. The pins 83 provided in the first under chamber 57 in the upper space of the center case 56 and the pins 91 provided in the second under chamber 61 in the under case 60 are moved downward. On the other hand, the solar cell panels P are transferred and positioned in the predetermined positions on the upper table 106 and on the under table 107 of the carried-in means 100 which locates in the side of the laminating sections 51, 52 (as described in the FIG. 11 with alternate long and short dashes 106, 107, and P), by the transferring means such as a robot (not shown).

Figure 12:
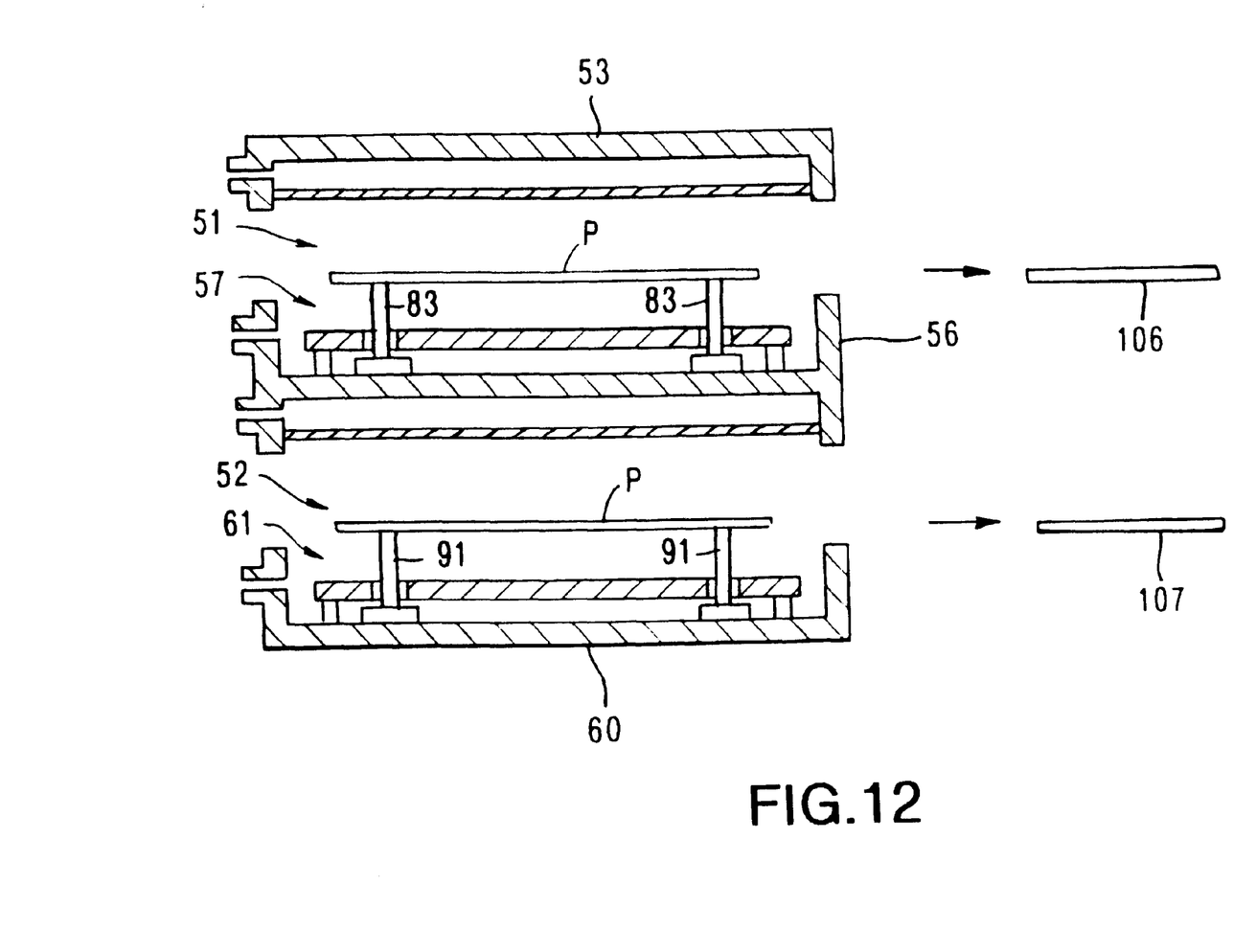
FIG. 12 is an explanation view which shows a state in which materials to be laminated is supported by the supporting rod above the heating stage in the laminating apparatus of in FIG. 8.

Then the upper table 106 and the under table 107 move to a left direction in the drawing by the traveling operation of the traveling part 103 of the carrying-in means 100 and the solar cell panels P put on the upper table 106 and the under table 107 are carried-in into the laminating sections 51, 52 (in FIG. 11 the state is shown with a solid line 106, 107). After carrying-in operation, the pins 83 provided in the first under chamber 57 in the upper space of the center case 56 and the pins 91 provided in the second under chamber 61 are moved upward and the upper ends of the pins 83, 91 extrude above from the upper surface of the heating stages 82, 90. And the under surface of the solar cell panels P put on the upper table 106 and the under table 107 are pushed by the upper ends of the pins 83, 91 and the solar cell panels P are moved upward from the upper surface of the upper table 106 and the under table 107 and they are supported by the upper ends of the pins 83, 91. As mentioned above, since a plurality of cutouts 110, 111 are provided in the upper table 106 and the under table 107, the pins 83, 91 can freely pass through the cutouts 110, 111 and they can moved upward smoothly without touching to the upper table 106 and the under table 107. After lifting the solar cell panels P from the upper surface of the upper table 106 and the under table 107, the traveling part 103 of the carrying-in means 100 move back to the contrary direction and the upper table 106 and the under table 107 move to the right direction in the drawing to go out from the laminating sections 51, 52 as shown in FIG. 12.

Figure 13:
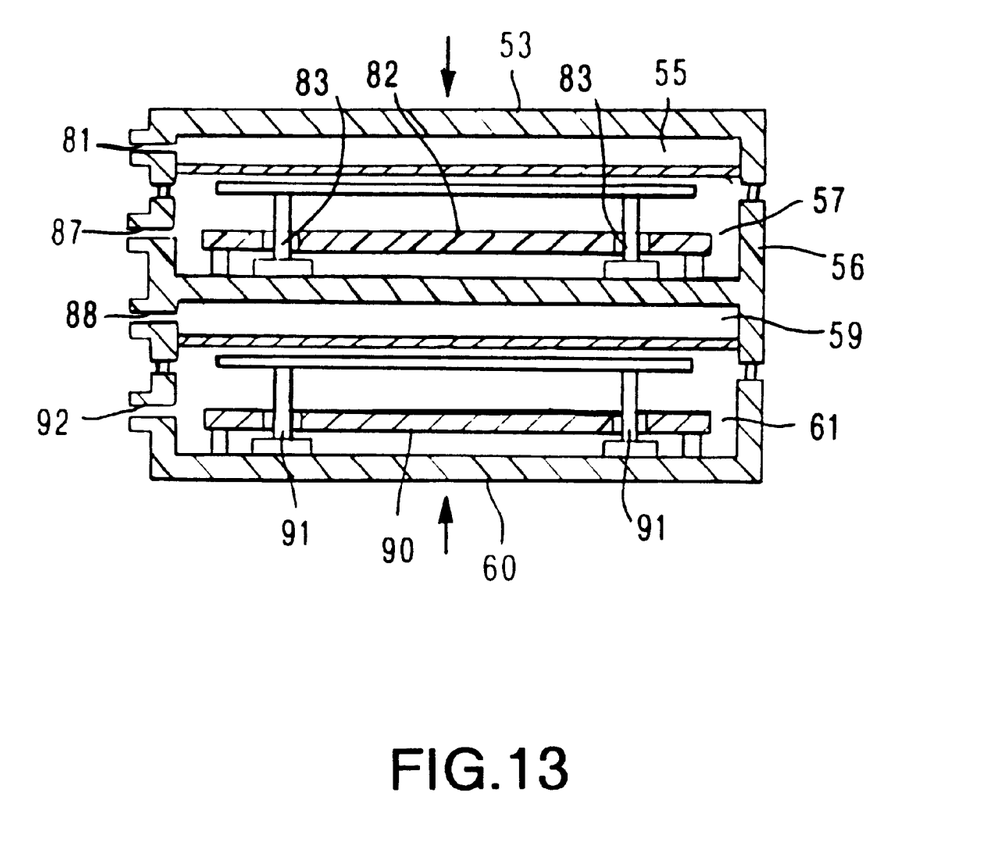
FIG. 13 is an explanation view which shows a state in which the upper chamber and the under chamber of the laminating apparatus of FIG. 8 are evacuated.

Then, as shown in FIG. 13, by moving the upper case 53 downward and the under case 60 upward, the upper laminating section 51 and the under laminating section 52 are airtightly closed. The operations of moving the upper case 53 downward and the under case 60 upward are performed by retracting movement of the cylinder 72 and the cylinder 73 as explained in reference with FIG. 8 and FIG. 9. Then, the first upper chamber 55 and the first under chamber 57 are evacuated at the same time through the suction and exhaust ports 81, 87 and the second upper chamber 59 and the second under chamber 61 are evacuated at the same time through the suction and exhaust ports 88, 92.

Figure 14:
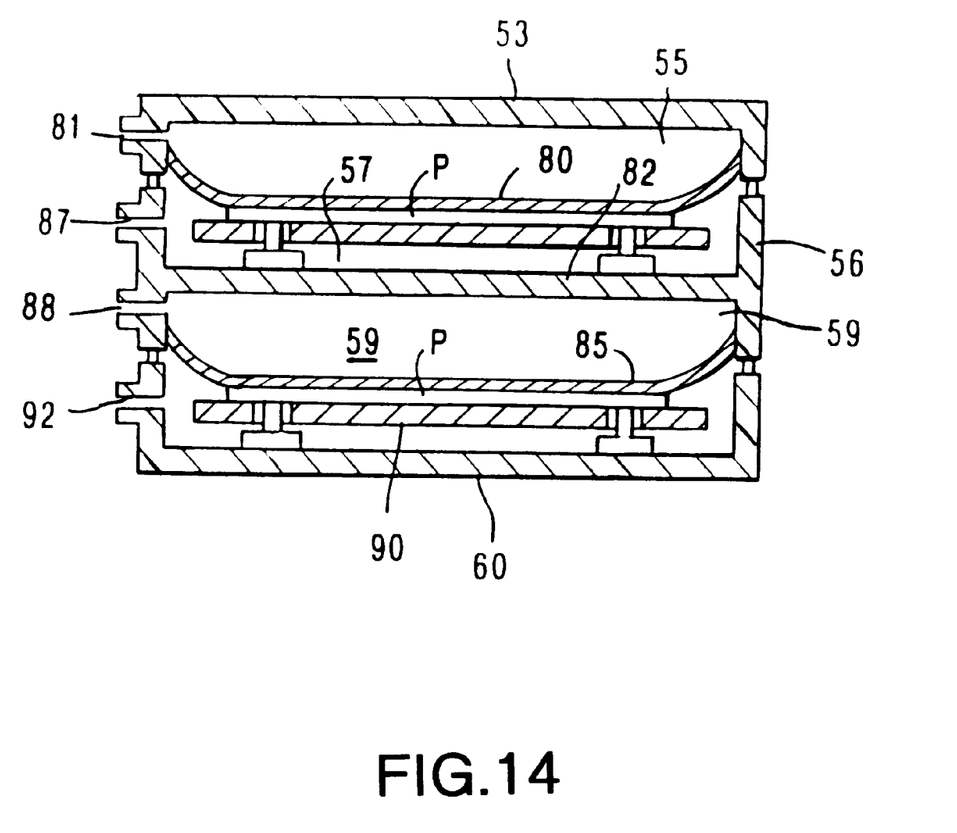
FIG. 14 is an explanation view which shows a state in which the materials to be laminated are heated and compressed in the laminating apparatus of FIG. 8.

During each chamber 55, 57, 59, 61 is evacuated, the heating stage 82 of the first under chamber 57 and the heating stage 90 of the second under chamber 61 are pre-heated. According to the present embodiment, since the heating stages 82, 90 are heated during the evacuation of the first under chamber 57 and the second under chamber 61 while the solar cell panels P are supported by the upper ends of the pins 83, 91, it can be obtained a high insulating effect to reduce the heat transfer to the solar cell panels P. After evacuating the first upper chamber 55 and the first under chamber 57, and the second upper chamber 59 and the second under chamber 61 to the predetermined degree of evacuation, for example 0.7 to 1.0 Torr, the pins 83, 91 are move downward in the first under chamber 57 and the second under chamber 61 by the lifting mechanism (not shown). As a result, the solar cell panels P supported by the upper ends of the pins 83, 91 directly contact the upper surfaces of the heating stages 82, 90 in the first under chamber 57 and the second under chamber 61 and then the solar cell panels P are heated. The chemical reaction of EVA resin, fillers 23, 24 in the solar cell panels P is stepped up by the heating and the bridge construction is smoothly formed. Keeping the state, the atmosphere is introduced into the first upper chamber 55 through the suction and exhaust port 81 and into the second upper chamber 59 through the suction and exhaust port 88. Then, as shown in FIG. 14, the diaphragm 80 expands downward in the upper laminating section 51 and the diaphragm 85 also expands downward in the under laminating section 52 to compress the solar cell panels P between the diaphragms 80, 85 and the upper surface of the heating stages 82, 90, respectively.

Figure 15:
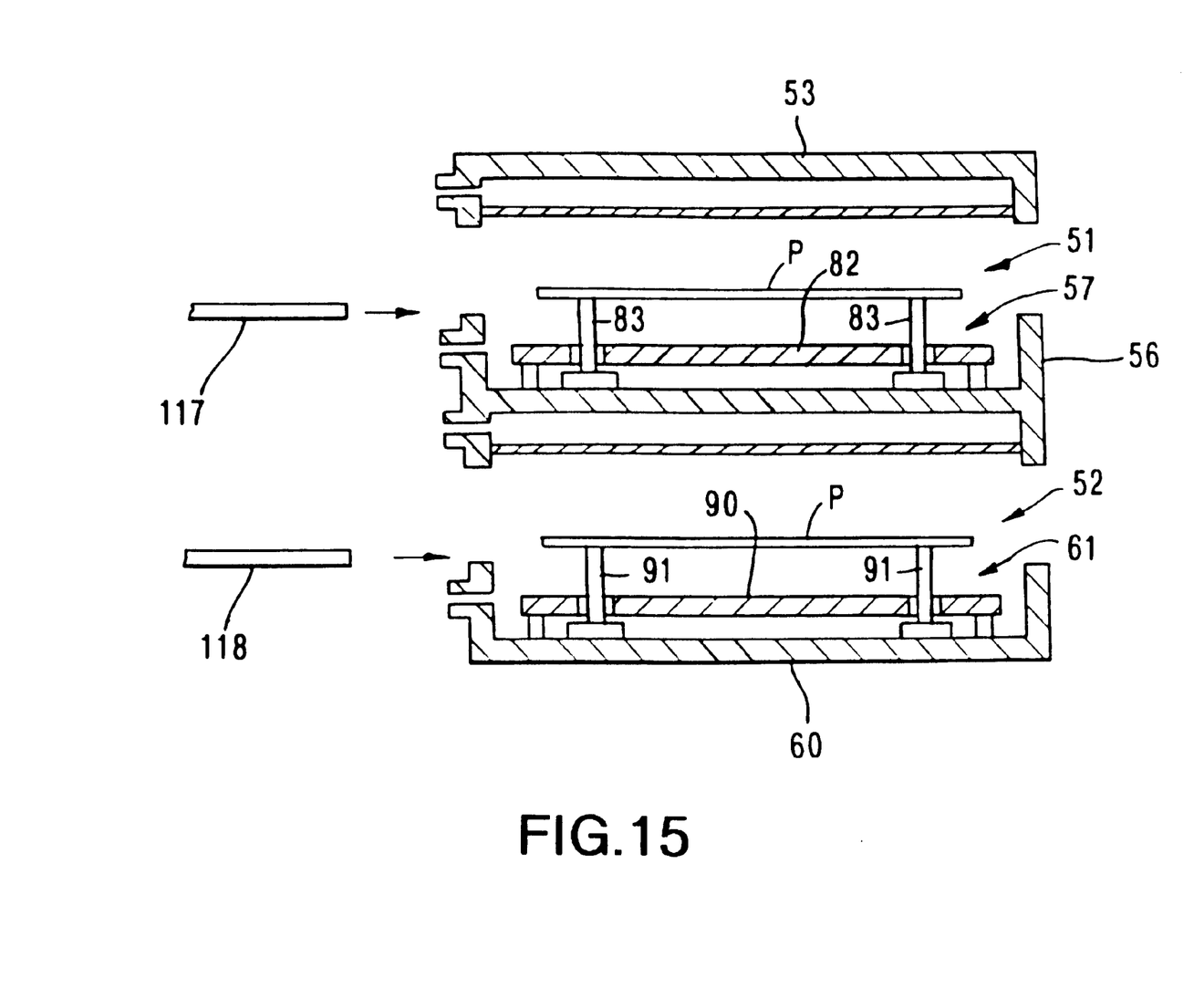
FIG. 15 is an explanation view which shows a state in which after finishing the process, the laminating sections are opened in the laminating apparatus of FIG. 8.

The solar cell panels P can be manufactured by the above mentioned heating and compressing process and then the laminating process finishes. Thereafter the atmosphere is introduced into the first under chamber 57 through the suction and exhaust port 87 and into the second under chamber 61 through the suction and exhaust port 92. The pins 83 of the first under chamber 57 and the pins 91 of the second under chamber 61 are moved upward to pushed the under surface of the solar cell panels P and as shown in FIG. 15, the solar call panels P are supported by the upper ends of the pins 83, 91. Further, moving the upper case 53 upward and the under case 60 downward, the upper laminating section 51 and the under laminating section 52 are opened. The operations of moving the upper case 53 upward and the under case 60 downward are performed by the expanding movement of the cylinder 72 and the cylinder 73 as explained in reference with FIG. 8 and FIG. 9.

Then, the upper table 117 and the under table 118 move to the right direction in the drawing into the upper laminating section 51 and the under laminating section 52 by the traveling motion of the traveling part 115 of the carrying-out means 101. As the upper table 117 and the under table 118 of the carrying-out means 101 include the cutouts 120, 121, the upper table 117 and the under table 118 can move into the upper laminating section 51 and the under laminating section 52 without touching the pins 83 of the first under chamber 57 and the pins 91 of the second under chamber 61.

Figure 16:
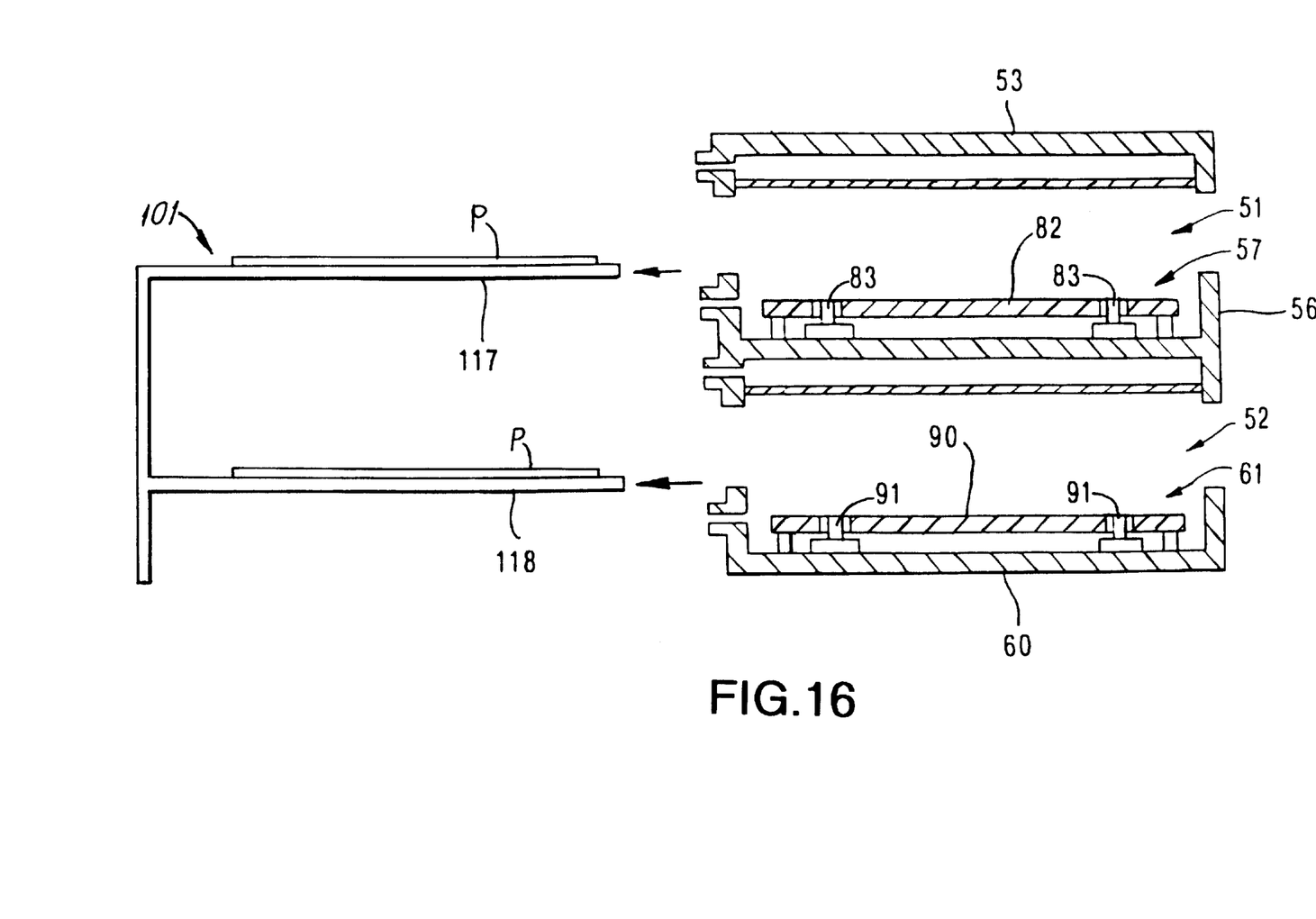
FIG. 16 is an explanation view which shows the laminated products are carried out from the laminating apparatus of FIG. 8.

After the upper table 117 and the under table 118 of the carrying-out means 101 move into the upper laminating section 51 and the under laminating section 52, respectively, the pins 83 provided in the first under chamber 57 in the upper space of the center case 56 and the pins 91 provided in the second under chamber 61 in the under case 60 are moved downward by the operation of the lifting mechanism (not shown), the level of the upper ends of the pins 83, 91 become same height as the upper surface of the heating stages 82, 90. As a result, the solar cell panels P supported by the upper ends of the pins 83, 91 are transferred to the upper table 117 and the under table 118 of the carrying-out means 101. Thereafter, the upper table 117 and the under table 118 move to the left direction in the drawing by the traveling movement of the traveling part 115 of the carrying-out means 101 and go out from the upper laminating section 51 and the under laminating section 52 as shown in FIG. 16. Then, the solar cell panels P carried-out from the laminating sections 51, 52 which solar cell panels P are put on the upper table 117 and the under table 118, are picked up by the transferring means such as robot (not shown) from the upper table 117 and the under table 118 and then they are transferred to the next process.

Repeating the above mentioned steps, according to the present embodiment, the solar cell panels P having good performance without bubbles inside thereof, can be produced.

According to the above explained laminating apparatuses 1, 50 of the present invention, the materials to be laminated are heated after evacuation, the fillers do not melt before removing the air. As a result the air bubbles do not remain inside the panel. Further since the materials to be laminated can be picked up while the materials are supported in the upper position above and apart from the heating stage, the pick up operation is simplified.

In the above explanations, as one of the example of the materials to be laminated, the solar cell panels P are selected, however, the laminating apparatuses 1, 50 according to the present invention can apply to laminate various kinds of materials such as laminated glasses, ornamental glasses and so on.

Especially, since according to the laminating apparatus 1 the heating stage can move upward and downward, the materials to be laminated having different thickness can be processed by the same laminating apparatus. Further the present apparatus can apply to the integrated modules, which integrate the solar panels and the building materials such as the external wall materials or the roof materials.

Further, stacking a plurality of laminating sections as described in reference with the laminating device 50, the laminating process can be performed with at least two times more throughput than that of the traditional apparatus. In the above exemplary embodiment, the laminating apparatus 50 include two stages type laminating section, however, it is possible to constitute the laminating apparatus having three or more stages type laminating section.

What is claimed is:

1. A laminating apparatus for laminating materials comprising:
   (a) at least one laminating section, each of the at least one laminating section comprising an upper chamber and an under chamber wherein the upper and under chambers are divided by a diaphragm means;
   (b) a heating stage located in the under chamber for heating the materials put on the heating stage wherein the heating stage is movable between an upward position and a downward position; and
   (c) a supporting means for supporting the materials in a position above and apart from the upper surface of the heating stage when the heating stage is located in its downward position and for placing the materials in direct contact with the upper surface of the heating stage when the heating stage is located in the upward position.

2. A laminating apparatus as set forth in claim 1, wherein said supporting means comprises at least one supporting rod and the heating stage comprises at least one hole for each of the at least one supporting rod wherein the at least one supporting rod is placed through the at least one hole of the heating stage and protruding from the upper surface of the stage when the heating stage is located in the downward position.

3. A laminating apparatus as set forth in claim 1, wherein at least two or more laminating sections are stacked in vertical direction.

4. A laminating apparatus as set forth in claim 1, further comprising a carrying means for carrying the materials into or from the laminating section.

5. A laminating apparatus for laminating materials comprising:
   (a) at least one laminating section, each of the at least one laminating section comprising an upper chamber and an under chamber wherein the upper and under chambers are divided by a diaphragm means;
   (b) a heating stage located in the under chamber for heating the materials put on the heating stage; and
   (c) a moving means for moving the materials between an upward position where the materials are supported above and apart from the upper surface of the heating stage and a processing position where the materials are placed in direct contact with the upper surface of the heating stage.

6. A laminating apparatus as set forth in claim 5, wherein at least two or more laminating sections are stacked in vertical direction.

7. A laminating apparatus as set forth in claim 5, further comprising a carrying means for carrying the materials into or from the laminating section.

8. A laminating apparatus as set forth in claim 1 wherein the supporting means is stationary.

9. A laminating apparatus as set forth in claim 5 wherein the heating stage is stationary.

10. A method for laminating a material in a chamber comprising:
    placing the material to be laminated in the chamber;
    creating a vacuum in the chamber;
    bringing the material into contact with the upper surface of a heat source after the creation of the vacuum;
    heating the material;
    introducing atmosphere into the chamber; and
    removing the material from contact with the upper surface of the heat source prior to removing the material from the chamber.

11. The method as set forth in claim 10 wherein the bringing step comprises raising the heat source and the removing step comprises lowering the heat source.

12. The method as set forth in claim 10 wherein the bringing step comprises lowering the material onto the upper surface of the heat source and the removing step comprises raising the material so that it is above and apart from the upper surface of the heat source.

* * * * *